United States Patent Office 3,787,396
Patented Jan. 22, 1974

3,787,396
17-HYDROXY - 7 - (LOWER ALKOXY)CARBONYL-
3-OXO-17α-PREGN-4-ENE-21-CARBOXYLIC ACID
γ-LACTONES AND CONGENERS
Richard M. Weier, Deerfield, Ill., assignor to
G. D. Searle & Co., Chicago, Ill.
No Drawing. Continuation-in-part of application Ser. No.
174,922, Aug. 25, 1971. This application Oct. 2, 1972,
Ser. No. 294,379
Int. Cl. C07c *173/00*
U.S. Cl. 260—239.57        21 Claims

ABSTRACT OF THE DISCLOSURE

Preparation and valuable biological properties—especially diuretic activity—of 17-hydroxy - 7 - (lower alkoxy)carbonyl-3-oxo-17α-pregn - 4 - ene-21-carboxylic acid γ-lactones, hydroxy acids and their salts corresponding thereto, and Δ¹ and thio ester analogs of these lactones, acids, and salts are disclosed

---

This application is a continuation-in-part of my copending application Ser. No. 174,922 filed Aug. 25, 1971.

This invention relates to 17-hydroxy-7-(lower alkoxy) carbonyl-3-oxo-17α-pregn-4-ene-21-carboxylic acid γ-lactones and congeners. More particularly, this invention provides new, useful, and unobvious chemical compounds of the formulas (I)
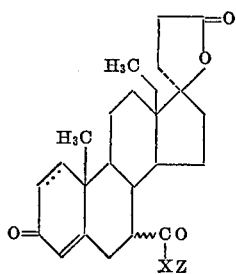

and (II)
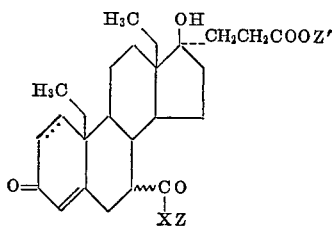

wherein X represents oxygen or sulfur; Z represents hydrogen, alkali metal, alkaline-earth metal/2, ammonium, or alkyl except when X represents sulfur, in which circumstance Z represents solely alkyl; Z' represents hydrogen, alkali metal, alkaline-earth metal/2, or ammonium; the dotted line signifies that the compounds can be either Δ⁴ or Δ¹,⁴; and the wavy line signifies that the 7-carbonyl substituent can be in either alpha or beta configuration. Those skilled in the art will recognize that the term "alkaline-earth metal/2" is dictated by the fact that such metals are divalent, whereas the other substituents represented by Z and Z' are monovalent; and when, for example, Z represents Ca/2 in Formula I, the contemplated salts are more conventionally depicted thus

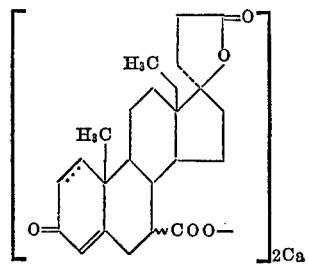

Among the alkyl radicals represented by Z, lower alkyl radicals are preferred, which is to say methyl, ethyl, propyl, isopropyl, butyl, isobutyl, sec.-butyl, tert.-butyl, pentyl, neopentyl, hexyl, isohexyl, heptyl, and like monovalent, saturated, acyclic straight- or branched-chain hydrocarbon groupings of empirical formula $$-C_nH_{2n+1}$$

wherein $n$ represents an integer less than 8.

Equivalent to the enformulated compounds for the purposes of this invention are solvates thereof in which biologically insignificant amounts of solvent are present.

The foregoing compounds are useful by reason of their valuable biological properties. Thus, for example, they are diuretic: They reverse the effect of desoxycorticosterone acetate (DCA) on urinary sodium and potassium.

The capacity of the instant compounds to reverse the renal electrolyte effects of DCA is evident from the results of a standardized test for this property carried out in rats substantially as described by C. M. Kagawa in chapter 34 of volume II of "Evaluation of Drug Activities: Pharmacometrics," by D. R. Laurence and A. L. Bacharach. Details of such testing are described in U.S. Pat. 3,422,096.

Those skilled in the art will recognize that observations of activity in standardized tests for particular biological effects are fundamental to the development of valuable new drug products, both veterinary and human.

Preparation of the compounds of this invention proceeds by heating 17-hydroxy-3-oxo-17α-pregna-4,6-diene-21-carboxylic acid γ-lactone with potassium cyanide in aqueous methanol buffered by ethyl acetate to produce 7α,4-aminomethylidyne-5-cyano - 17 - hydroxy-3-oxo-5β, 17α-pregnane-21-carboxylic acid γ-lactone, which is heated with hydrochloric acid to afford 4α,7α-carbonyl-5-cyano-17-hydroxy-3-oxo-5β,17α-pregnane - 21 - carboxylic acid γ-lactone. From the latter compound, on heating with sodium metal and an alkanol of the formula $$C_nH_{2n+1}OH$$

wherein $n$ is defined as before, and subsequent acidification with 10% hydrochloric acid, the corresponding 17-hydroxy-17α-(lower alkoxy)carbonyl-3-oxo-17α-pregn-4-ene - 21 - carboxylic acid γ-lactone and 17-hydroxy-7β-(lower alkoxy)carbonyl-3-oxo-17α-pregn - 4 - ene-21-carboxylic acid γ-lactone, separable by fractional crystallization and chromatography on dry silica gel, are obtained. These epimers are converted to other 7α-carbonyl and 7β-carbonyl epimers of the invention as set forth in the following 6 paragraphs and illustrated by Example 2 et seq. herein, configuration at carbon atom number 7 of the described products being identical with that of the starting materials in each instance.

Warming a 17-hydroxy-7-(lower alkoxy)carbonyl-3-oxo-17α-pregn-4-ene-21-carboxylic acid γ-lactone with 1 equivalent of an alkali metal hydroxide in methanol affords the corresponding alkali metal 17-hydroxy-7-(lower alkoxy)carbonyl-3-oxo - 17α - pregn-4-ene-21-carboxylate, which on brief contact with excess very dilute hydrochloric acid yields the corresponding 17-hydroxy-7-(lower alkoxy)carbonyl-3-oxo - 17α - pregn-4-ene-21-carboxylic acid. Warming one of the latter acids with 1 equivalent of an alkaline-earth metal hydroxide in methanol or maintaining prolonged contact between the acid and excess ammonia dissolved q.s. saturation in 2-propanol affords the corresponding alkaline-earth metal or ammonium 17-hydroxy-7-(lower alkoxy)carbonyl-3-oxo - 17α - pregn-4-ene-21-carboxylate, respectively.

By heating a 17 - hydroxy-7-(lower alkoxy)carbonyl-3-oxo-17α-pregn-4-ene-21-carboxylic acid γ-lactone with excess aqueous methanolic potassium hydroxide under nitrogen and subsequent acidification with hydrochloric acid, the corresponding 17-hydroxy-3-oxo-17α-pregn-4-ene-7,21-dicarboxylic acid γ-lactone results. Conversion thereof to the corresponding alkali metal 21-carboxy-17-hydroxy-3-oxo-17α-pregn-4-ene-7-carboxylate γ-lactone is achieved by prolonged contact at room temperatures under nitrogen with 1 equivalent of an alkali metal bicarbonate in aqueous methanol, whereas the corresponding alkaline - earth metal 21-carboxy-17-hydroxy-3-oxo-17α-pregn-4-ene-7-carboxylate γ-lactone eventuates from a 17-hydroxy-3-oxo-17α-pregn-4-ene-7,21-dicarboxylic acid γ-lactone by warming it with 1 equivalent of an alkaline-earth metal hydroxide in 2-propanol under nitrogen. The same procedure adapted to preparing an ammonium 17-hydroxy-7-(lower alkoxy)carbonyl-3-oxo-17α-pregn-4-ene-21-carboxylate from the corresponding 21-carboxylic acid γ-lactone serves for the preparation of an ammonium 21 - carboxy-17-hydroxy-3-oxo-17α-pregn-4-ene-7-carboxylate from the corresponding 17-hydroxy-3-oxo-17α-pregn-4-ene-7,21-dicarboxylic acid γ-lactone.

Heating a 17-hydroxy-3-oxo-17α-pregn-4-ene-7,21-dicarboxylic acid γ-lactone with 2 equivalents of aqueous alkali metal hydroxide affords the corresponding di(alkali metal) 17-hydroxy-3-oxo-17α-pregn-4-ene-7,21-dicarboxylate, which in turn is briefly contacted with excess, very dilute hydrochloric acid to produce the corresponding 17 - hydroxy-3-oxo-17α-pregn-4-ene-7,21-dicarboxylic acid. Warming one of the later acids with 2 equivalents of an alkaline-earth metal hydroxide in methanol or maintaining prolonged contact between the acid and excess ammonia dissolved q.s. saturation in 2-propanol affords the corresponding di(alkaline-earth metal or ammonium) 17-hydroxy-3-oxo-17α-pregn-4-ene-7,21-dicarboxylate, respectively.

An alternative method of preparing a 17-hydroxy-7-(lower alkoxy)carbonyl-3-oxo-17α-pregn-4-ene-21-carboxylic acid γ-lactone of this invention is to contact a 17-hydroxy-3-oxo-17α-pregn-4-ene-7,21-dicarboxylic acid γ-lactone with isobutyl chloroformate in cold tetrahydrofuran containing 4-methylmorpholine under nitrogen, thereby producing the anhydride of 17-hydroxy-3-oxo-17α-pregn-4-ene-7,21-dicarboxylic acid γ-lactone with isobutoxyformic acid, then heat the anhydride under nitrogen with an alkanol of the formula $$C_nH_{2n+1}OH$$

wherein n is defined as before. It is not essential that the intermediate anhydride be isolated, although this is frequently preferable.

Upon consecutive and prolonged admixture, in chloroform containing triethylamine at room temperatures or below, of (1) ethyl chloroformate and (2) an alkanethiol of the formula

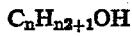

wherein n is defined as before, followed by acidification with dilute hydrochloric acid, a 17-hydroxy-3-oxo-17α-pregn-4-ene-7,21-dicarboxylic acid γ-lactone is converted to the corresponding 17-hydroxy-7-(lower alkyl)thiocarbonyl-3-oxo-17α-pregn-4-ene-21-carboxylic acid γ-lactone.

By heating a 17-hydroxy-7-(lower alkoxy)carbonyl-3-oxo-17α-pregn-4-ene-21-carboxylic acid γ-lactone with dichlorodicyanobenzoquinone in benzene under nitrogen, the corresponding 17-hydroxy-7-(lower alkoxy)carbonyl-3-oxo-17α-pregna-1,4-diene-21-carboxylic acid γ-lactone is prepared, from which the Δ¹,⁴ counterparts of the Δ⁴ compounds whose preparation is described in the preceding 5 paragraphs and illustrated by Examples 2–10 and 15–24 herein are available by analogous procedures.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations refer to the D line of sodium, the solvent being chloroform at room temperature unless otherwise indicated.

EXAMPLE 1

(A) 7α,4-aminomethylidyne-5-cyano-17-hydroxy-3-oxo-5β,17α-pregnane-21-carboxylic acid γ-lactone A solution consisting of approximately 51 parts of 17-hydroxy-3-oxo-17α-pregna-4,6-diene - 21 - carboxylic acid γ-lactone, 50 parts of potassium cyanide, 72 parts of ethyl acetate, 454 parts of methanol, and 160 parts of water is heated at the boiling point under reflux with stirring for 4½ hours, then allowed to stand at room temperatures overnight. Organic solvents are thereupon removed by vacuum distillation, the oily residue is diluted with 500 parts of water, and the pH is adjusted to 7 by slowly introducing 20% hydrochloric acid. Hydrogen cyanide is evolved, and precipitation occurs. The precipitate is filtered off, dried in air, and taken up in ethyl acetate. The ethyl acetate solution is extracted with 20% hydrochloric acid, and residual ethyl acetate is removed from the extract by bubbling nitrogen therethrough. The extract is thereupon cooled to 0° and neutralized with sodium hydroxide. The resultant tan precipitate is filtered off, washed well with water, dried in air, and recrystallized from acetone to give 7α,4-aminomethylidyne-5-cyano-17-hydroxy-3-oxo-5β,17α - pregnane-21-carboxylic acid γ-lactone melting at 278–283°. The product has the formula

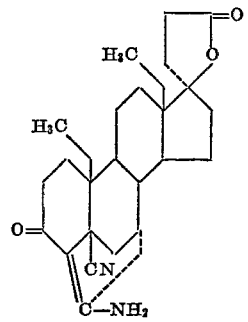

(B) 4α,7α-carbonyl-5-cyano-17-hydroxy-3-oxo-5β,17α-pregnane-21-carboxylic acid γ-lactone A slurry of approximately 21 parts of 7α,4-aminomethylidyne - 5 - cyano-17-hydroxy-3-oxo-5β,17α-pregnane-21-carboxylic acid γ-lactone in 350 parts of 3% hydrochloric acid is heated at 90–95° with occasional stirring for 4½ hours, then cooled. Insoluble solids are separated by filtration, washed to neutrality with water,

dried in air, and recrystallized from 2-propanol to give 4α,7α - carbonyl-5-cyano-17-hydroxy-3-oxo-5β,17α-pregnane-21-carboxylic acid γ-lactone melting at 284–289°. The product has the formula

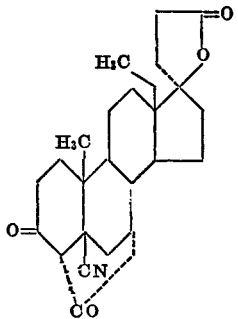

(C) 17-hydroxy-7α-methoxycarbonyl-3-oxo-17α-pregn-4-ene-21-carboxylic acid γ-lactone and 7β-epimer To 185 parts of sodium metal is added 4200 parts of methanol at a rate such that rapid refluxing is maintained. When the addition is complete, refluxing is continued for 3 hours via external heating, whereupon 14,200 parts of methanol followed by 197 parts of 4α,7α-carbonyl-5-cyano-17-hydroxy-3-oxo-5β,17α - pregnane-21-carboxylic acid γ-lactone is introduced. The resultant solution is heated at the boiling point under reflux with stirring in a nitrogen atmosphere for 22 hours, whereupon solvent is removed by vacuum distillation. The oily residue is taken up in 4000 parts of water. The aqueous solution is diluted with 4000 parts of acetone and then acidified with 10% hydrochloric acid. After 30 minutes, the acetone is removed by vacuum distillation; and the residue is extracted with ethyl acetate. The extract is washed well with aqueous 5% potassium bicarbonate and then with water, next dried over magnesium sulfate and sodium sulfate, and finally stripped of solvent by vacuum distillation. The resultant oil is dissolved in a minimum amount of methanol. Colorless 17-hydroxy-7α-methoxycarbonyl-3-oxo-17α-pregn-4-ene-21-carboxylic acid γ-lactone crystallizes out of the methanol solution and is isolated by filtration and dried in air. It melts at 190–192°.

The mother liquor is chromatographed on silica gel, using benzene and mixtures thereof with increasing amounts of ethyl acetate as developing solvents. From an eluate comprising 15% ethyl acetate in benzene, on evaporation of solvent and recrystallization of the residue from methanol, 17-hydroxy-7β-methoxycarbonyl-3-oxo-17α-pregn-4-ene-21-carboxylic acid γ-lactone melting at 238–240° is obtained. This product has the formula

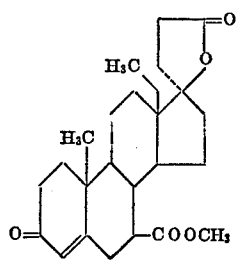

EXAMPLE 2

Potassium 17-hydroxy-7α-methoxycarbonyl-3-oxo-17α-pregn-4-ene-21-carboxylate dihydrate A solution of 43 parts of 17-hydroxy-7α-methoxycarbonyl-3-oxo-17α-pregn-4-ene-21-carboxylic acid γ-lactone and 135 parts of aqueous 4% potassium hydroxide in 2000 parts of methanol, protected by a nitrogen atmosphere, is warmed to 40° during 5 minutes and thereafter stirred at ambient temperatures overnight. The solution is thereupon heated at the boiling point under reflux for 2 hours, at which point solvent is removed by vacuum distillation and the residue taken up in 3000 parts of water. The solution thus obtained is washed well with ethyl acetate and then "distilled to dryness" leaving a gummy residue which is taken up in a minimum amount of ethanol. Sufficient ethyl acetate is added to precipitate potassium 17 - hydroxy-7α-methoxy-carbonyl-3-oxo-17α-pregn-4-ene21-carboxylate dihydrate as a white flocculent solid. Water of crystallization is removed by heating in vacuo at around 80°. The dihydrate has the formula

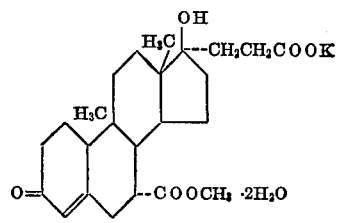

EXAMPLE 3

17-hydroxy-7α-methoxycarbonyl-3-oxo-17α-pregn-4-ene-21-carboxylic acid

To a solution of 1 part of potassium 17-hydroxy-7α-methoxycarbonyl - 3 - oxo-17α-pregn-4-ene-21-carboxylate in 70 parts of water is added 20 parts of 5% hydrochloric acid. The resultant precipitate is filtered off, washed with water, and dried in air. The material thus isolated is 17-hydroxy-7α-methoxycarbondyl-3-oxo-17α-pregn-4-ene-21-carboxylic acid, the formula of which is

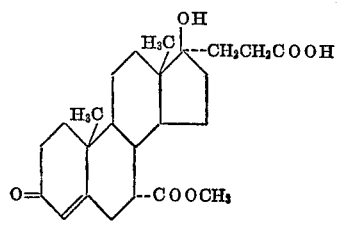

EXAMPLE 4

17-hydroxy-3-oxo-17α-pregn-4-ene-7α,21-dicarboxylic acid γ-lactone

A solution of approximately 1 part of 17-hydroxy-7α-methoxycarbonyl - 3 - oxo-17α-pregn-4-ene-21-carboxylic acid γ-lactone and 12 parts of aqueous 5% potassium hydroxide in 8 parts of methanol is heated at the boiling point under reflux in a nitrogen atmosphere for 6 hours, whereupon methanol is removed by vacuum distillation and the aqueous residue is diluted with 25 parts of acetone. The resultant mixture is acidified with 3% hydrochloric acid, allowed to stand at room temperatures for 20 minutes and then concentrated to one-fifth volume by vacuum distillation. Insoluble solids are filtered off and taken up in 50 parts of ethyl acetate. Concentration of the ethyl acetate solution to one-half volume by vacuum distillation results in precipitation of hydrated 17-hydroxy-3-oxo-17α-pregn-4-ene-7α,21-dicarboxylic acid γ-lactone, which is isolated by filtration. Additional product is isolable by extracting the filtrate with aqueous 5% potassium bicarbonate, acidifying the extract with 3% hydrochloric acid, again concentrating by vacuum distillation until precipitation of product occurs, and filtering. Water of crystallization is removed from the hydrate thus produced by heating in vacuo at around 80°, affording anhydrous product melting at 266–270° and having the formula

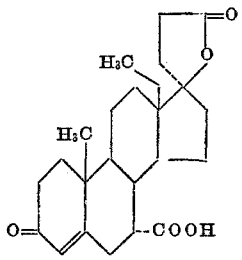

EXAMPLE 5

Potassium 21-carboxy-17-hydroxy-3-oxo-17α-pregn-4-ene-7α-carboxylate γ-lactone

A solution of 412 parts of 17-hydroxy-3-oxo-17α-pregn-4-ene-7α,21-dicarboxylic acid γ-lactone monohydrate and 100 parts of potassium bicarbonate in a mixture of 7900 parts of methanol and 12,000 parts of water is stirred under nitrogen at room temperatures overnight, then heated at 40° for 30 minutes. Substantially all of the liquids are thereupon removed by vacuum distillation, leaving a yellow oil which is azetropically dried by distilling ethanol therefrom. Trituration of the dried oil with ethyl acetate affords potassium 21-carboxy-17-hydroxy-3-oxo-17α-pregn-4-ene-7α-carboxylate γ-lactone as a colorless solid which is isolated by filtration and dried in air. The product has the formula

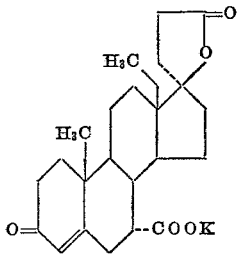

EXAMPLE 6

Dipotassium 17-hydroxy-3-oxo-17α-pregn-4-ene-7α,21-dicarboxylate dihydrate

A solution of 106 parts of 17-hydroxy-3-oxo-17α-pregn-4-ene-7α,21-dicarboxylic acid γ-lactone monohydrate in 730 parts of aqueous 4% potassium hydroxide is diluted with 2 volumes of water. The resultant solution is heated at 90–95° for 30 minutes, then stripped of water by vacuum distillation. The residue is extracted with 2-propanol. The propanol solution is filtered and, in turn, stripped of solvent by vacuum distillation, leaving a yellow powder which is dried in vacuo at 65 for 24 hours, then redissolved in 10,000 parts of hot 2-propanol. This solution is filtered, and the filtrate is concentrated to one-fourth volume by vacuum distillation. The precipitate thrown down as the concentrate cools is dipotassium 17-hydroxy-3-oxo-17α-pregn-4-ene-7α,21-dicarboxylate dihydrate, which is filtered off and dried in air. Water of crystallization can be removed from the dihydrate by heating in vacuo at around 80°. The dihydrate has the formula

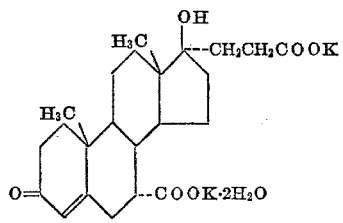

EXAMPLE 7

17-hydroxy-3-oxo-17α-pregn-4-ene-7α,21-dicarboxylic acid

To a solution of 2 parts of dipotassium 17-hydroxy-3-oxo-17α-pregn-4-ene-7α,21-dicarboxylate dihydrate in 80 parts of water is added 10 parts of 5% hydrochloric acid. The colorless precipitate which results is filtered off, washed with water, and dried in air. The product thus isolated has the formula

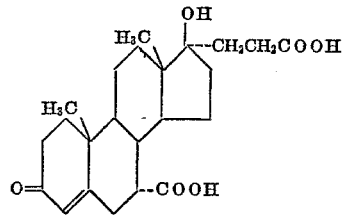

EXAMPLE 8

7α-ethylthiocarbonyl-17-hydroxy-3-oxo-17α-pregn-4-ene-21-carboxylic acid γ-lactone To a solution of 6 parts of 17-hydroxy - 3 - oxo - 17α-pregn - 4 - ene-7α,21-dicarboxylic acid γ-lactone monohydrate in approximately 15 parts of triethylamine and 150 parts of chloroform maintained at 0° is added approximately 7 parts of ethyl chloroformate. The resultant solution is allowed to warm to room temperature and stirred overnight, whereupon solvents are removed by vacuum distillation. The brown gummy residue is redissolved in a mixture of approximately 4 parts of triethylamine and 150 parts of chloroform. To this solution is added 5 parts of ethanethiol. The resultant solution is stirred at room temperatures overnight. Solvents are then again removed by vacuum distillation, and the residue is taken up in chloroform. The chloroform solution is washed with approximately 3% hydrochloric acid and then with water, dried over sodium sulfate, and stripped of chloroform by vacuum distillation. The residue is chromatographed on dry silica gel, using 12% ethyl acetate in benzene as developing solvent. Upon evaporation of the solvent, 7α-ethylthiocarbonyl-17-hydroxy-3-oxo-17α-pregn - 4 - ene-21-carboxylic acid γ-lactone melting at 202–204° is obtained. The product has the formula

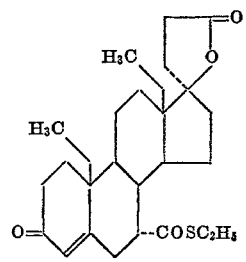

EXAMPLE 9

17-hydroxy-3-oxo-7α-propylthiocarbonyl-17α-pregn-4-ene-21-carboxylic acid γ-lactone Substitution of 5 parts of propanethiol for the ethanethiol called for in Example 8 affords, by the procedure there detailed, 17 - hydroxy-3-oxo-7α-propylthiocarbonyl-17α-pregn-4-ene-21-carboxylic acid γ-lactone.

EXAMPLE 10

17-hydroxy-7α-methoxycarbonyl-3-oxo-17α-pregna-1,4-diene-21-carboxylate γ-lactone tetartohydrate A solution of 14 parts of 17-hydroxy-7α-methoxycarbonyl-3-oxo-17α-pregn-4-ene-21-carboxylic acid γ-lactone and 11 parts of dichlorodicyanobenzoquinone in 1800 parts of benzene is heated at the boiling point under reflux with stirring in a nitrogen atmosphere for 20 hours, then diluted with approximately 1000 parts of ether and filtered. The filtrate is washed with aqueous 2% sodium sulfite until the washes are colorless, whereupon it is washed with water, dried over sodium sulfate and magnesium sulfate, and stripped of solvent by vacuum distillation. The resdual yellow oil is chromatographed on dry silica gel, using 12% ethyl acetate in benzene as developing solvent. Upon evaporation of the solvent and recrystallization of the residue from ether, 17-hydroxy-7α-methoxycarbonyl-3-oxo-17α-pregna-1,4-diene-21 - carboxylic acid γ-lactone tetartohydrate melting at 217–222° is obtained. Water of crystallization can be removed by heating in vacuo at around 80°. The tetartohydrate has the formula

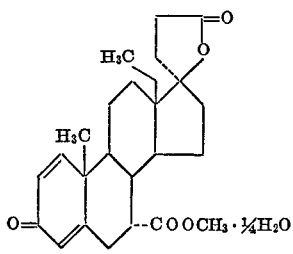

EXAMPLE 11

17-hydroxy-3-oxo-17α-pregna-1,4-diene-7α,21-dicarboxylic acid γ-lactone

A solution of 1 part of 17-hydroxy - 7α - methoxycarbonyl-3-oxo-17α-pregna-1,4-diene - 21 - carboxylic acid γ-lactone tetartohydrate and 12 parts of aqueous 5% potassium hydroxide in 20 parts of methanol is heated at the boiling point under reflux for 6 hours. Methanol is thereupon removed by vacuum distillation; and the aqueous residue is diluted with 25 parts of acetone, adjusted to pH 4 with 3% hydrochloric acid, and allowed to stand at room temperature for 20 minutes. Sufficient liquid is then removed by vacuum distillation to bring about precipitation. The precipitate is filtered off and taken up in ethyl acetate. The ethyl acetate solution is extracted with aqueous 5% potassium bicarbonate. The bicarbonate extract is acidified and then concentrated by vacuum distillation. The residual yellow oil is chromatographed on dry precipitate which forms on standing is filtered off and dried in air. The product thus isolated is 17-hydroxy-3-oxo - 17α - pregna - 1,4 - diene - 7α,21 - dicarboxylic acid γ-lactone.

EXAMPLE 12

Dipotassium 17-hydroxy-3-oxo-17α-pregna-1,4-diene-7α,21-dicarboxylate

A solution of 100 parts of 17-hydroxy - 3 - oxo - 17α-pregna-1,4-diene - 7α,21 - dicarboxylic acid γ-lactone and 744 parts of aqueous 4% potassium hydroxide in 4000 parts of methanol is heated at the boiling point under reflux for 2 hours. Substantially all of the liquids are removed from the resultant solution by vacuum distillation, and the yellow gummy residue is further dried azeotropically by distilling ethanol therefrom. The colorless residue thus obtained is recrystallized from ethyl acetate to give dipotassium 17-hydroxy-3-oxo-17α-pregna-1,4-diene-7α,21-dicarboxylate.

EXAMPLE 13

17-hydroxy-3-oxo-17α-pregna-1,4-diene-7α,21-dicarboxylic acid

Substitution of 2 parts of dipotassium 17-hydroxy-3-oxo-17α-pregna-1,4-diene-7α,21-dicarboxylate for the dipotassium 17-hydroxy-3-oxo-17α-pregn-4-ene-7α,21-dicarboxylate dihydrate called for in Example 7 affords, by the procedures there detailed, 17-hydroxy-3-oxo-17α-pregna-1,4-diene-7α,21-dicarboxylic acid.

EXAMPLE 14

7α-ethoxycarbonyl-17-hydroxy-3-oxo-17α-pregn-4-ene-21-carboxylic acid γ-lactone and 7β-epimer To 18 parts of sodium metal is added 840 parts of absolute ethanol at a rate such that rapid refluxing is maintained. When the addition is complete, refluxing is continued for 3 hours via external heating, whereupon 14,000 parts of ethanol followed by approximately 20 parts of 4α,7α-carbonyl-5-cyano-7-hydroxy-3-oxo-5β,17α-pregnane-21-carboxylic acid γ-lactone is introduced. The resultant solution is heated at the boiling point under reflux with stirring in a nitrogen atmosphere for 21 hours, then cooled and diluted with 10 volumes of water. Solvent is removed by vacuum distillation. An equal volume of acetone is added to the residue, followed by sufficient 3% hydrochloric acid to induce acidity. The resultant mixture is stripped of acetone by vacuum distillation, and the residual aqueous gum is extracted with dichloromethane. The dichloromethane extract is dried over sodium sulfate and magnesium sulfate, whereupon solvent is distilled off in vacuo and the residual yellow foam chromatographed on dry silica gel, using 10% ethyl acetate in benzene as developing solvent. Upon evaporation of solvent and recrystallization of the residue from petroleum solvent boiling in the range 95–127°, 7α-ethoxycarbonyl - 17 - hydroxy-3-oxo-17α-pregn-4-ene-21-carboxylic acid γ-lactone melting at 143–145° is obtained.

The mother liquor is chromatographed on silica gel, using benzene and mixtures thereof with increasing amounts of ethyl acetate as developing solvents. From an eluate comprising 15% ethyl acetate in benzene, on evaporation of solvent, 7β-ethoxycarbonyl-17-hydroxy-3-oxo-17α-pregn-4-ene-21-carboxylic acid γ-lactone is obtained as the residue.

EXAMPLE 15

17-hydroxy-7α-isopropoxycarbonyl-3-oxo-17α-pregn-4-ene-21-carboxylic acid γ-lactone To a solution of 80 parts of 17-hydroxy-3-oxo-17α-pregn-4-ene-7α,21-dicarboxylic acid γ-lactone monohydrate and 20 parts of 4-methylmorpholine in 600 parts of tetrahydrofuran at —15° under nitrogen is added, with stirring, 28 parts of isobutyl chloroformate. A white precipitate is thrown down. After 5 minutes, 640 parts of 2-propanol is introduced; and the resultant mixture is filtered in a nitrogen atmosphere. The filtrate is stripped of solvent by vacuum distillation, and the oily brown residue is taken up in 1560 parts of 2-propanol. This solution is heated at the boiling point under reflux for 6 hours, whereupon 1 part of imidazole is introduced. Boiling under reflux is resumed for a period of 18 hours, at which point 2000 parts of water is introduced. The resultant mixture is boiled under reflux for 35 hours, then freed of solvent by vacuum distillation. The gummy residue is extracted with ethyl acetate. The extract is thoroughly washed with aqueous 5% potassium bicarbonate and then with water, dried over sodium sulfate and magnesium sulfate, and stripped of solvent by vacuum distillation. The residual brown oil is chromatographed on dry silica gel, using 1% ethanol in chloroform as developing solvent. Upon evaporation of the solvent and recrystallization of the residue from ether, 17-hydroxy - 7α - isopropoxycarbonyl-3-oxo-17α-pregn-4-ene-21-carboxylic acid γ-lactone melting at 181–183° and further characterized by a specific rotation of +16.12° is obtained.

EXAMPLE 16

(A) Anhydride of 17-hydroxy-3-oxo-17α-pregn-4-ene-7α, 21-dicarboxylic acid γ-lactone with isobutoxyformic acid To a solution of 221 parts of 17-hydroxy-3-oxo-17α-pregn-4-ene-7α,21-dicarboxylic acid γ-lactone and 50 parts of 4-methylmorpholine in 2250 parts of tetrahydrofuran at —10° under nitrogen is added, with stirring, 65 parts of isobutyl chloroformate. A white precipitate forms immediately. Stirring is continued for 10 minutes, whereupon the reaction mixture is filtered; and the filtrate is stripped of solvent by vacuum distillation. The residual yellow oil, on chilling overnight, crystallizes. The material thus isolated is the anhydride of 17-hydroxy-3-oxo-17α-pregn-4-ene-7α,21-dicarboxylic acid γ-lactone with isobutoxyformic acid which, recrystallized from hexane, melts at 144–146°. The product has the formula

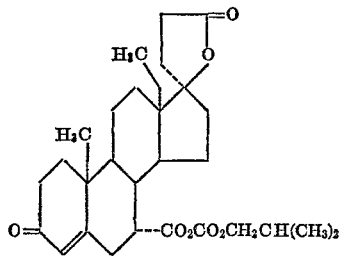

(B) 17-hydroxy-7α-isobutoxycarbonyl-3-oxo-17α-pregn-4-ene-21-carboxylic acid γ-lactone A solution of 49 parts of the anhydride of 17-hydroxy-3-oxo-17α-pregn-4-ene-7α,21-dicarboxylic acid γ-lactone with isobutoxyformic acid in 800 parts of isobutyl alcohol is heated at 90–95° under nitrogen for 12 hours. Solvent is removed by vacuum distillation, whereupon the residue crystallizes. Recrystallization from methanol affords 17-hydroxy - 7α - isobutoxycarbonyl-3-oxo-17α-pregn-4-ene-21-carboxylic acid γ-lactone melting at 200–202° and having a specific rotation in chloroform solution of +17.40°.

EXAMPLE 17

17-hydroxy-7α-isohexyloxycarbonyl-3-oxo-17α-pregn-4-ene-21-carboxylic acid γ-lactone To a solution of 80 parts of 17-hydroxy-3-oxo-17α-pregn-4-ene-7α,21-dicarboxylic acid γ-lactone and 20 parts of 4-methylmorpholine in 600 parts of tetrahydrofuran at −15° under nitrogen is added, with stirring, 28 parts of isobutyl chloroformate. Precipitation occurs. Stirring is continued for 5 minutes, whereupon 640 parts of 2-propanol is introduced. The resultant mixture is filtered under nitrogen, and the filtrate is stripped of solvent by vacuum distillation. The residue is taken up in 1560 parts of 4-methyl-1-pentanol, and this solution is heated at the boiling point under reflux for 3 hours. Approximately 2000 parts of water is added at this point and boiling under reflux then resumed for a further 35 hours. Solvent is thereupon removed by vacuum distillation, and the residue is extracted with ethyl acetate. The ethyl acetate extract is consecutively washed with aqueous 5% potassium bicarbonate and water, dried over sodium sulfate and magnesium sulfate, and finally stripped of solvent by vacuum distillation. The residue is chromatographed on dry silica gel, using 3½% ethyl acetate in chloroform as developing solvent. On evaporation of solvent and recrystallization of the residue from ether, colorless crystalline 17-hydroxy-7α-isohexyloxycarbonyl-3-oxo-17α-pregn-4-ene-21-carboxylic acid γ-lactone melting at 118–120° and with a specific rotation of +20.90° is obtained.

EXAMPLE 18

Potassium 7α - ethoxycarbonyl - 17-hydroxy-3-oxo-17α-pregn-4-ene-21-carboxylate monohydrate A solution of 43 parts of 7α-ethoxycarbonyl-17-hydroxy-3-oxo-17α-pregn-4-ene-21-carboxylic acid γ-lactone and 135 parts of aqueous 4% potassium hydroxide in 2000 parts of ethanol, protected by a nitrogen atmosphere, is allowed to stand overnight at room temperatures and then heated at 50–55° for 20 minutes. Solvent is thereupon removed by vacuum distillation and the residue triturated with ethyl acetate. Insoluble solids are separated by filtration and dried in air. The product thus isolated is potassium 7α - ethoxycarbonyl - 17 - hydroxy-3-oxo-17α-pregn-4-ene-21-carboxylate monohydrate. The precipitate is isolated by filtration and dried in air. Water of crystallization is removed by heating in vacuo at around 80°.

EXAMPLE 19

Potassium 17-hydroxy-7α-isopropoxycarbonyl-3-oxo-17α-pregn-4-ene-21-carboxylate

A solution of 43 parts of 17-hydroxy-7α-isopropoxycarbonyl-3-oxo-17α-pregn-4-ene-21-carboxylic acid γ-lactone and 135 parts of aqueous 4% potassium hydroxide in 2000 parts of 2-propanol, protected by a nitrogen atmosphere, is allowed to stand overnight at room temperatures and then heated at 50–55° for 20 minutes. Solvent is thereupon removed by vacuum distillation and the residue triturated with ether. Insoluble solids are filtered out and dried in air. The product thus isolated is potassium 17 - hydroxy - 7α-isopropoxycarbonyl-3-oxo-17α-pregn-4-ene-21-carboxylate.

EXAMPLE 20

Sodium 17 - hydroxy - 7α-methoxycarbonyl-3-oxo-17α-pregn-4-ene-21-carboxylate

To a solution of 200 parts of 17-hydroxy-7α-methoxycarbonyl-3-oxo-17α-pregn-4-ene-21-carboxylic acid γ-lactone in 7000 parts of methanol under nitrogen is added, with stirring, 397 parts of aqueous 5% sodium hydroxide. The resultant mixture is stirred at 40° for 2 hours, then stripped of solvent by vacuum distillation. The residue is washed by slurrying with ethyl acetate and dried in air. The product thus isolated is sodium 17-hydroxy-7α-methoxycarbonyl-3-oxo-17α-pregn-4-ene-21-carboxylate.

EXAMPLE 21

Calcium bis[17-hydroxy-7α - methoxycarbonyl-3-oxo-17α-pregn-4-ene-21-carboxylate]

A mixture of 200 parts of 17-hydroxy-7α-methoxycarbonyl-3-oxo-17α-pregn-4-ene-21-carboxylic acid, 19 parts of calcium hydroxide, and 4000 parts of methanol is stirred at 40° under nitrogen for 2 hours. Solvent is then removed by vacuum distillation, and the residue is recrystallized from ethyl acetate. The product thus isolated is clacium bis[17-hydroxy-7α-methoxycarbonyl-3-oxo-17α - pregn-4-ene-21-carboxylate].

EXAMPLE 22

Ammonium 17-hydroxy-7α - methoxycarbonyl-3-oxo-17α-pregn-4-ene-21-carboxylate

To 20 parts of 2-propanol, saturated with ammonia, is added 1 part of 17-hydroxy-7α-methoxycarbonyl-3-oxo-17α-pregn-4-ene-21-carboxylic acid. The resulting mixture is allowed to stand at room temperatures for 24 hours, at which point solvent is removed by vacuum distillation. The residue is washed with ethyl acetate and dried in air. The product thus isolated is ammonium 17-hydroxy-7α-methoxycarbonyl-3-oxo-17α-pregn-4-ene-21-carboxylate.

EXAMPLE 23

Sodium 21-carboxy-17-hydroxy-3 - oxo-17α-pregn-4-ene-7α-carboxylate γ-lactone

Substitution of 84 parts of sodium bicarbonate for the potassium bicarbonate called for in Example 5 affords, by the procedure there detailed, sodium 21-carboxy-17-hydroxy-3-oxo-17α-pregn-4-ene-7α-carboxylate γ-lactone.

EXAMPLE 24

Calcium bis[21-carboxy-17-hydroxy-3-oxo - 17α-pregn-4-ene-7α-carboxylate γ-lactone]

A mixture of 100 parts of 17-hydroxy-3-oxo-17α-pregn-4-ene-7α,21-dicarboxylic acid γ-lactone monohydrate, 9 parts of calcium hydroxide, and 5000 parts of 2-propanol is stirred at 40° under nitrogen for 2 hours. The resultant mixture is stripped of solvent by vacuum distillation, and the residue is slurried with hot ethyl acetate. The insoluble solids isolated by filtration are calcium bis[21-carboxy-17-hydroxy-3-oxo-17α-pregn-4-ene-7α-carboxylate γ-lactone].

EXAMPLE 25

Ammonium 21-carboxy-17-hydroxy-3 - oxo-17α-pregn-4-ene-7α-carboxylate γ-lactone

Substitution of 1 part of 17-hydroxy-3-oxo-17α-pregn-4-ene-7α,21-dicarboxylic acid γ-lactone monohydrate for the 17-hydroxy-7α-methoxycarbonyl - 3-oxo-17α-pregn-4-ene-21-carboxylic acid called for in Example 21 affords, by the procedure there detailed, ammonium 21-carboxy-17-hydroxy-3-oxo-17α-pregn-4-ene-7α - carboxylate γ-lactone.

What is claimed is:

1. A compound of the formula

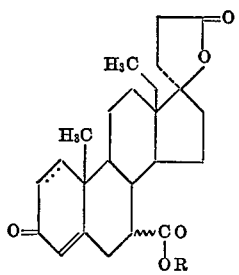

or

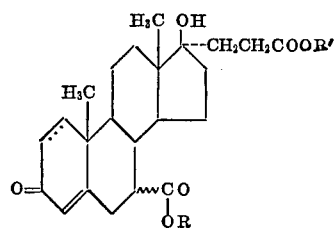

or

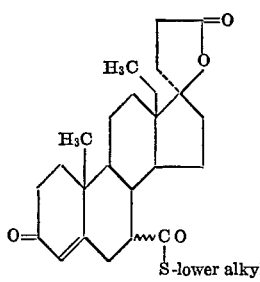

wherein R represents hydrogen, alkali metal, Ca/2, ammonium, or lower alkyl; R' represents hydrogen, alkali metal, Ca/2 or ammonium; the dotted line signifies the locus of an optional double bond; and the wavy line designates alpha or beta configuration.

2. A compound according to claim 1 which is 17-hydroxy - 7β - methoxycarbonyl-3-oxo-17α-pregn-4-ene-21-carboxylic acid γ-lactone.

3. A compound according to claim 1 having the formula

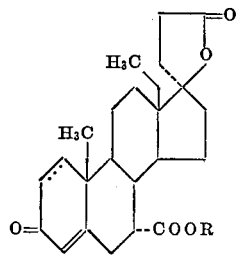

wherein R represents hydrogen, alkali metal, Ca/2, ammonium, or lower alkyl; and the dotted line signifies the locus of an optional double bond.

4. A compound according to claim 1 which is 17-hydroxy - 3 - oxo-17α-pregn-4-ene-7α,21-dicarboxylic acid γ-lactone.

5. A compound according to claim 1 which is potassium 21-carboxy - 17 - hydroxy-3-oxo-17α-pregn-4-ene-7α-carboxylate γ-lactone.

6. A compound according to claim 1 having the formula

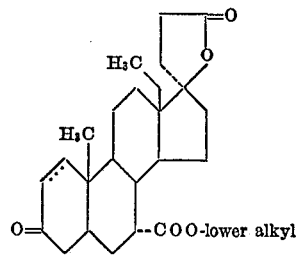

wherein the dotted line signifies the locus of an optional double bond.

7. A compound according to claim 1 which is 17-hydroxy-7α-methoxycarbonyl - 3 - oxo-17α-pregna-1,4-diene-21-carboxylic acid γ-lactone.

8. A compound according to claim 1 having the formula

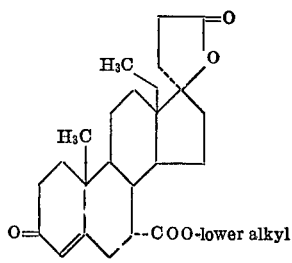

9. A compound according to claim 1 which is 17-hydroxy-7α-methoxycarbonyl - 3 - oxo-17α-pregn-4-ene-21-carboxylic acid γ-lactone.

10. A compound according to claim 1 which is 17-hydroxy-7α-isopropoxycarbonyl - 3 - oxo - 17α-pregn-4-ene-21-carboxylic acid γ-lactone.

11. A compound according to claim 1 having the formula

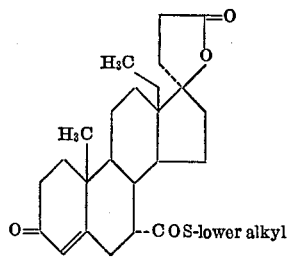

wherein the dotted line signifies the locus of an optional double bond.

12. A compound according to claim 1 which is 7α-ethylthiocarbonyl - 17 - hydroxy - 3-oxo-17α-pregn-4-ene-21-carboxylic acid γ-lactone.

13. A compound according to claim 1 having the formula

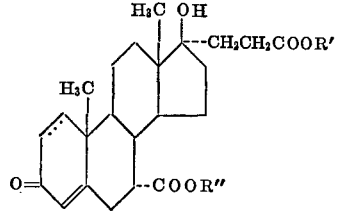

wherein R′ represents hydrogen, alkali metal, Ca/2, or ammonium; R″ represents hydrogen, potassium, or methyl; and the dotted line signifies the locus of an optional double bond.

14. A compound according to claim 1 which is dipotassium 17-hydroxy - 3 - oxo-17α-pregn-4-ene-7α-21-dicarboxylate.

15. A compound according to claim 1 having the formula

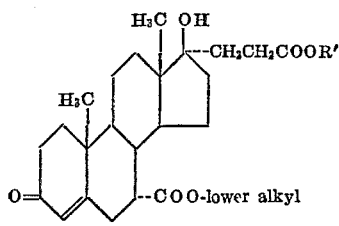

wherein R′ represents hydrogen, alkali metal, Ca/2 or ammonium.

16. A compound according to claim 1 which is potassium 17-hydroxy-7α-ethoxycarbonyl - 3 - oxo-17α-pregn-4-ene-21-carboxylate.

17. A compound according to claim 1 which is potassium 17-hydroxy-7α-isopropoxycarbonyl 3 - oxo - 17α-pregn-4-ene-21-carboxylate.

18. 7α,4 - aminomethylidyne - 5 - cyano-17-hydroxy-3-oxo-5β,17α-pregnane-21-carboxylic acid γ-lactone.

19. 4α,7α-carbonyl - 5-cyano-17-hydroxy-3-oxo-5β,17α-pregnane-21-carboxylic acid γ-lactone.

20. Anhydride of 17-hydroxy-3-oxo-17α-pregn-4-ene-7α,21-dicarboxylic acid γ-lactone with isobutoxy-formic acid.

21. A compound according to claim 1 which is potassium 17-hydroxy - 7α-methoxycarbonyl-3-oxo-17α-pregn-4-ene-21-carboxylate.

No references cited.

ELBERT L. ROBERTS, Primary Examiner

U.S. Cl. X.R.
260—397.1; 424—241

UNITED STATES PATENT OFFICE
CERTIFICATE OF CORRECTION

Patent No. 3,787,396　　　　Dated January 22, 1974

Inventor(s) Richard M. Weier

It is certified that error appears in the above-identified patent and that said Letters Patent are hereby corrected as shown below:

Column 1, first and second formulae; column 2, first formula; column 4, first formula; column 5, first and second formulae; column 7, first and second formulae; column 8, second formula; column 9, first formula; column 11, first formula; column 13, first, third, and fourth formulae; and column 14, first, second and third formulae;

" 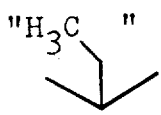 "　　should be　-- 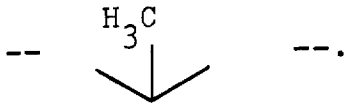 --.

Column 2, line 57, "hydroxy-17α" should be --hydroxy-7α--.

Column 6, line 13, "4-ene 21-carboxylate" should be -- 4-ene-21-carboxylate --.

Column 6, first formula,

" 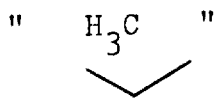 "　　should be　-- 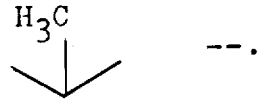 --.

Column 6, line 38, "methoxycarbondyl" should be -- methoxycarbonyl --.

Column 7, line 26, "azetropically" should be -- azeotropically --.

Column 7, line 57, "at 65" should be -- at 65° --.

UNITED STATES PATENT OFFICE
CERTIFICATE OF CORRECTION

Patent No. 3,787,396      Dated January 22, 1974

Inventor(s) Richard M. Weier

It is certified that error appears in the above-identified patent and that said Letters Patent are hereby corrected as shown below:

Column 9, line 5, "resdual" should be -- residual --.

Column 9, lines 44-45, "distillation. The residual yellow oil is chromatographed on dry" should be -- distillation to the point of incipient precipitation. The colorless --.

Column 10, line 9, "7-hydroxy" should be -- 17-hydroxy --.

Column 12, line 44, "clacium" should be -- calcium --.

Signed and sealed this 20th day of August 1974.

(SEAL)
Attest:

McCOY M. GIBSON, JR.
Attesting Officer

C. MARSHALL DANN
Commissioner of Patents